June 15, 1965         G. H. WHITE          3,189,511
              GYPSUM WALLBOARD
           Filed Nov. 23, 1962

INVENTOR.
George H. White
BY
Robert F. Hause
ATTORNEY

United States Patent Office 3,189,511
Patented June 15, 1965

3,189,511
GYPSUM WALLBOARD
George H. White, Kenmore, N.Y., assignor to National Gypsum Company, Buffalo, N.Y., a corporation of Delaware
Filed Nov. 23, 1962, Ser. No. 239,666
2 Claims. (Cl. 161—162)

This invention relates to gypsum wallboard and is particularly directed to a wallboard core composition of increased and uniform flexibility.

The art of the manufacture of gypsum wallboard involves the need of control of uniformity in many respects to attain and maintain essential characteristics required for its normal uses. Some of the several characteristics of which uniformity is sought include strength, lightness of weight, consistency of dimensions, hardness of edges, ability to recess nails without fracturing paper or core, and thorough adhesion of paper to core. A primary means of attaining uniformity of characteristics has been by attaining increased quality and uniformity of calcination of the gypsum ore and thus increased purity of the resultant calcined gypsum plaster.

Concurrently in time, a desire has arisen in the building industry to provide arcuate sections in building walls and ceilings. Standard production, high quality gypsum wallboard has been found insufficiently flexible to be readily and easily shaped, on the job site, to conform to the curvature desired by building contractors.

To obtain increased flexibility with otherwise high quality gypsum wallboard, it has been a common practice to increase the free moisture in the boards, as by removing the boards from stacks and placing them individually about the job site, for 24 hours or more, preferably in the more humid places available. Such extra handling is obviously undesirable as costly, and uncertain as to degree of effect on flexibility.

It is an object of the present invention to provide a gypsum wallboard of high quality having substantially increased flexibility under all conditions.

It is a further object of the invention to provide a gypsum wallboard of increased flexibility, immediately on delivery to a job site with substantially less need for humidification of the board.

It is a further object of the invention to provide an increase in flexibility in high quality gypsum wallboard with all other essential characteristics of the wallboard of substantially equal or improved quality.

These and other objects of the invention will become readily apparent from the following specification and drawings in which.

Figure 1:
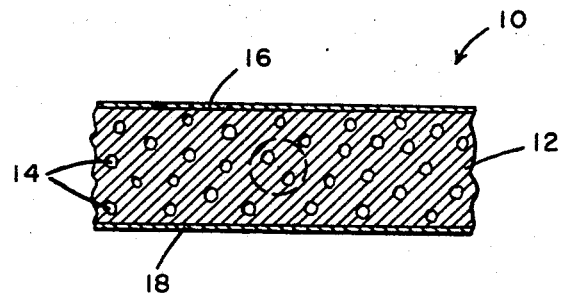
FIG. 1 is a sectional view of a gypsum wallboard, embodying the present invention.

Referring now to FIG. 1, there is shown a gypsum wallboard 10 made in accordance with the invention, including a cellular basically gypsum core 12 having hollow cells 14 therethroughout for providing suitably lower density, and paper cover sheets 16 and 18, all in accordance with common wallboard practice.

Figure 2:
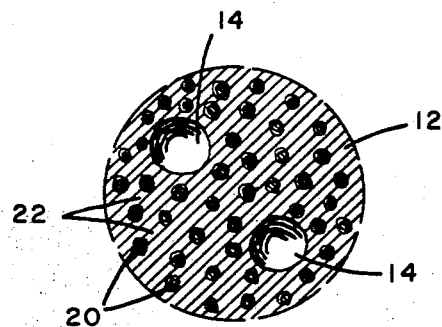
FIG. 2 is an enlarged view of the portion of FIG. 1 indicated by the circle in FIG. 1.

The gypsum of the core 12 of the invention consists basically of a high quality calcined gypsum having a purity of about 85% to 90% which has been rehydrated during the board manufacture. Interspersed uniformly throughout the solid portion of the core are finely ground inert anhydrous calcium sulfate particles 20, FIG. 2, sufficient in quantity to provide about 20% of the solids by volume of the core.

The inert anhydrous calcium sulfate particles 20 are each completely surrounded by the rehydrated gypsum, but are substantially unbonded and unattached, whereby the solid portions of core are provided with a great plurality of, or network of, relatively thinner, set, interlaced gypsum walls 22, completely supported by but not bonded or attached to the fine inert particles. By the provision of such completely supported but relatively thin network of walls 22 of continuous interlaced, set gypsum crystals, the core is made markedly more flexible without substantial loss in strength and integrity.

A formulation suitable for making the core 12 of the invention is as follows:

|  | Parts by weight |
|---|---|
| Calcined gypsum (85%) | 80 |
| Inert anhydrous calcium sulfate | 20 |
| Set accelerator-calcium sulfate dihydrate | 1 |
| Cellulose fiber | 1 |
| Starch | 1 |
| Foaming agent (alkyl aryl sulfonate) | .04 |
| Water | 102 |

The novel addition of the inert fine anhydrous calcium sulfate particles to the gypsum wallboard composition may be made at any time in the preparation of the slurry provided there is subsequent thorough and uniform dispersion of the particles throughout the composition. A preferred addition of the particles is by thorough mixing with the calcined gypsum prior to any other addition of ingredients thereto.

The preferred fineness of the inert particles is such that about 100% pass through a 100 mesh screen and about 90% through a 325 mesh screen, however, considerable variation may be made in fineness in accordance with the invention.

In the above formulation of the invention, it will be realized that the calcined gypsum, of 85% purity, and the inert anhydrous calcium sulfate provide substantially all of the solid portion of the board core to be formed therefrom, whereby the core solids are substantially 80% calcined gypsum and 20% anhydrous calcium sulfate. With an 85% purity calcined gypsum, it will be seen that (.85×80) the resultant core solids consist of essentially 68% rehydrated pure calcined gypsum. Accordingly, the present invention may be defined as controlled decrease in calcined gypsum purity of the total gypsum core formulation.

Variations from the above described formulation, in accordance with the invention, are contemplated, including formulations wherein the basic calcined gypsum varies from the purity of 85% to either higher or lower purities. The purity of any given calcined gypsum can be determined by known methods in the art. A suitable formulation can then be determined to provide the improved board of the present invention by the addition thereto of sufficient inert anhydrous calcium sulfate to provide a resultant combined purity, as above described, of preferably about 65% to 70%, however, this combined purity, if between 60% and 75%, has been found to provide an improvement in accordance with the invention without an excessive detriment to other qualities. With combined purities of below 60%, it becomes difficult to maintain satisfactory bond between the core and the paper cover sheets, whereby peeling and blistering result.

Since a normal variation in purity of any given source of calcined gypsum is in the order of 2%, a resultant core formulation having an above-described combined purity of from about 65% to 70% can be maintained.

It is essential that the material to be combined with the calcined gypsum for the purpose of decreasing the combined purity be inert and otherwise of very similar characteristics to the calcined gypsum and for this reason the preferred material is inert anhydrous calcium sulfate, which is gypsum which has been over-calcined to an extent that it will no longer rehydrate and set in the known manner of calcined gypsum, nor in any manner affect the rehydration process in the manufacture of the wallboard.

The flexibility of ⅜ inch thick gypsum wallboard made in accordance with the invention and having a formulation as defined above, was compared with the flexibility of gypsum wallboard similar thereto except that 100 parts by weight of calcined gypsum and no anhydrous calcium sulfate were employed, typifying the prior art wallboard. Results of this comparison showed a 100% increase in flexibility provided by the invention. The flexibility was determined by placing test samples of wallboard, 12 inches by 19 inches, on two knife edge supports, each extending across the full 12 inch width of the bottom face of the sample and each located ½ inch from each respective end of the sample. Load was applied to the top face of the sample by a knife edge load disposed parallel to and half way between the two knife edge supports and extending across the full 12 inch width of the top face of the sample. Loads were increased progressively until failure and the maximum amount of deflection of the sample prior to failure is recorded. Maximum deflection of the board of prior art formulation was 5/16 inch whereas with the board of the present invention it was ⅝ inch. These tests were conducted on board samples which had preconditioning by oven drying at 120° F. for about four hours, to provide substantially bone dry test samples. In bone dry conditions, gypsum wallboard is least flexible, and thus, it is in this condition that flexing of wallboards becomes a substantial problem. A 100% increase in flexibility of bone dry gypsum wallboard thus provides a very substantial improvement under conditions which normally aggravate problems relating to flexing.

Having completed a detailed disclosure of the preferred embodiments of my invention so that those skilled in the art may practice the same, I contemplate that variations may be made without departing from the essence of the invention or the scope of the appended claims.

I claim:
1. Gypsum wallboard comprising a unitary, solid, mineral core disposed between paper cover sheets, said core being the dried rehydrated product of the following formulation:

| | Parts by weight |
|---|---|
| Calcined gypsum of purity between 75% and 100% | 65 to 95 |
| Inert anhydrous calcium sulfate | (¹) |
| Set accelerator | About 1 |
| Fibrous material | About 1 |
| Starch | About 1 |
| Foaming agent | About .04 |
| Water | About 100 |

¹ Sufficient parts by weight to reduce the effective purity to 65% to 70%.

2. Gypsum wallboard comprising a unitary, solid, mineral core disposed between paper cover sheets, said core being the dried rehydrated product of the following formulation:

| | Parts by weight |
|---|---|
| Calcined gypsum of purity between 75% and 100% | 65 to 95 |
| Inert anhydrous calcium sulfate | (¹) |
| Calcium sulfate dihydrate accelerator | About 1 |
| Cellulose fiber | About 1 |
| Starch | About 1 |
| Foaming agent | About .04 |
| Water | About 100 |

¹ Sufficient parts by weight to reduce the effective purity to 65% to 70%.

References Cited by the Examiner
UNITED STATES PATENTS

| | | | |
|---|---|---|---|
| 1,266,200 | 5/18 | Blumenberg | 106—110 |
| 1,702,729 | 2/29 | Hite | 154—45.9 |
| 1,778,008 | 10/30 | Delaney | 154—45.9 |
| 1,909,465 | 5/33 | Hansen | 106—110 |
| 1,986,001 | 1/35 | Lefenbure | 106—110 |
| 2,078,198 | 4/37 | King | 106—110 |
| 2,341,426 | 2/44 | Dailey | 106—110 |
| 2,508,600 | 5/50 | Fitzsimmons | 106—109 |
| 2,741,562 | 4/56 | Hayworth | 106—109 |
| 2,785,988 | 3/57 | Lipkind et al. | 106—109 |
| 2,965,528 | 12/60 | Loechl | 154—45.9 |

EARL M. BERGERT, *Primary Examiner.*

MORRIS SUSSMAN, *Examiner.*